US012217037B2

(12) United States Patent
Huang

(10) Patent No.: US 12,217,037 B2
(45) Date of Patent: Feb. 4, 2025

(54) PACKAGE DEPLOYMENT METHOD AND APPARATUS, TERMINAL DEVICE, AND STORAGE MEDIUM

(71) Applicant: Huawei Technologies Co., Ltd., Shenzhen (CN)

(72) Inventor: Wei Huang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 134 days.

(21) Appl. No.: 17/825,897

(22) Filed: May 26, 2022

(65) Prior Publication Data
US 2022/0283795 A1 Sep. 8, 2022

Related U.S. Application Data

(63) Continuation of application No. PCT/CN2020/125519, filed on Oct. 30, 2020.

(30) Foreign Application Priority Data

Nov. 27, 2019 (CN) .......................... 201911184397.3

(51) Int. Cl.
*G06F 8/61* (2018.01)
*G06F 8/76* (2018.01)

(52) U.S. Cl.
CPC . *G06F 8/61* (2013.01); *G06F 8/76* (2013.01)

(58) Field of Classification Search
CPC ............................ G06F 2009/4557; G06F 8/60
See application file for complete search history.

(56) References Cited

U.S. PATENT DOCUMENTS 9,430,207 B1 8/2016 Bandhole et al.
2007/0067426 A1* 3/2007 Goyal .................... H04L 67/02
709/223

(Continued)

FOREIGN PATENT DOCUMENTS

CN 103189839 A 7/2013
CN 104035797 A 9/2014
(Continued)

OTHER PUBLICATIONS

Oct.Y, "[Android] Airtest IDE enables multi-device management and automatic packaging," Total 11 pages (Mar. 2019). With an English translation.

*Primary Examiner* — Ziaul A Chowdhury
(74) *Attorney, Agent, or Firm* — Leydig, Voit & Mayer, Ltd.

(57) ABSTRACT

A package deployment method and apparatus, a terminal device, and a storage medium are disclosed, which are applicable to the field of computer technologies. The method includes: searching, for a plurality of registered devices, for a package adapted to each of the plurality of devices, where a registration operation of the plurality of devices is completed by using a pre-constructed integrated development environment (IDE) tool; and distributing and deploying a found package to a corresponding device, where the corresponding device is a device in the plurality of devices. The constructed IDE tool each time can register with and be connected to a plurality of different devices; searches, for the plurality of registered devices, for a package adapted to each device; and then distributes and deploys a found package to each corresponding device.

18 Claims, 11 Drawing Sheets

(56) References Cited

U.S. PATENT DOCUMENTS

| | | | |
|---|---|---|---|
| 2013/0205277 A1* | 8/2013 | Seven | G06F 9/44536 |
| | | | 717/121 |
| 2014/0229948 A1 | 8/2014 | Fries | |
| 2016/0055573 A1* | 2/2016 | Chen | G06Q 30/0613 |
| | | | 705/26.41 |
| 2017/0344449 A1 | 11/2017 | Tung et al. | |
| 2018/0143825 A1 | 5/2018 | Noens | |
| 2019/0199803 A1* | 6/2019 | Murray | H04L 67/141 |
| 2021/0155177 A1* | 5/2021 | Harata | B60R 16/0231 |

FOREIGN PATENT DOCUMENTS

| | | |
|---|---|---|
| CN | 104111827 A | 10/2014 |
| CN | 106126286 A | 11/2016 |
| CN | 106294158 A | 1/2017 |
| CN | 108509333 A | 9/2018 |
| CN | 108897548 A | 11/2018 |
| CN | 108958826 A | 12/2018 |
| CN | 110267256 A | 9/2019 |

* cited by examiner

PACKAGE DEPLOYMENT METHOD AND APPARATUS, TERMINAL DEVICE, AND STORAGE MEDIUM

CROSS-REFERENCE TO RELATED APPLICATIONS

This application is a continuation of International Application No. PCT/CN2020/125519, filed on Oct. 30, 2020, which claims priority to Chinese Patent Application No. 201911184397.3, filed on Nov. 27, 2019. The disclosures of the aforementioned applications are hereby incorporated by reference in their entireties.

TECHNICAL FIELD

This application pertains to the field of computer technologies, and in particular, to a package deployment method and apparatus, a terminal device, and a storage medium.

BACKGROUND

In a multi-end adaptation development scenario, a plurality of packages may be obtained by compiling one APP based on different device screen sizes and interaction logic, to separately adapt to different devices. For example, a specific APP simultaneously supports three types of devices: a mobile phone, a Pad, and a large-screen television. During debugging, three types of packages need to be compiled to respectively adapt to the three types of devices. In addition, the packages need to be efficiently distributed and deployed to the three types of devices, to view a program running effect.

When a package is deployed to various devices, an integrated development environment (IDE) is usually used for implementation. The IDE is an application program used to provide a program development environment, usually includes tools such as a code editor, a compiler, a debugger, and a graphical user interface, and integrates integrated development functions such as code writing, code compiling, and code debugging.

Currently, terminal-side IDEs mainly include Android Studio, XCode, and the like. However, these IDEs each time can deploy a package to only a single device through a USB connection line or Wifi. When an APP needs a plurality of devices to simultaneously participate in debugging, an operation of package deployment is difficult and deployment efficiency is low.

SUMMARY

In view of this, embodiments of this application provide a package deployment method and apparatus, a terminal device, and a storage medium, to simultaneously deploy a package to a plurality of different devices, thereby effectively improving efficiency of package deployment.

According to a first aspect, an embodiment of this application provides a package deployment method, including:
 searching, for a plurality of registered devices, for a package adapted to each of the plurality of devices, where a registration operation of the plurality of devices is completed by using a pre-constructed integrated development environment (IDE) tool; and
 distributing and deploying a found package to a corresponding device, where the corresponding device is a device in the plurality of devices.

In this application, the constructed IDE tool each time can register with and be connected to a plurality of different devices; searches, for the plurality of registered devices, for a package adapted to each device; and then distributes and deploys a found package to each corresponding device, so that the package is simultaneously deployed to the plurality of different devices, to effectively improve efficiency of package deployment.

In a possible implementation of the first aspect, the registration operation of the plurality of devices may include:
 establishing communications connection to the plurality of devices by using the IDE tool;
 after the communications connection is successfully established, receiving status information of each of the plurality of devices; and
 displaying the received status information in a device list interface of the IDE tool to complete the registration operation.

A plurality of different devices may establish communications connection to the IDE tool constructed in this application in a wired or wireless manner. Then, the IDE tool may receive status information of each of the plurality of devices, for example, a name and a model of the device, whether the device is normal, and whether the device accepts a package. Finally, the received status information may be displayed in the device list interface of the IDE tool, so that debugging personnel can visually discover information related to each device participating in package deployment and debugging. In addition, registration information of each device is recorded to complete the registration operation.

Further, the status information of various different devices may be differentiated by using different icons, colors, and fonts, and are displayed in the device list interface in a preset arrangement manner. In addition, the status information may be stored in a specified database, to record information about a device related to package deployment and debugging.

In a possible implementation of the first aspect, the distributing and deploying a found package to a corresponding device may include:
 determining whether each of the plurality of devices meets a preset package distribution and deployment condition;
 for a first device in the plurality of devices that meets the package distribution and deployment condition, distributing and deploying a package adapted to the first device to the corresponding first device; and
 for a second device in the plurality of devices that does not meet the package distribution and deployment condition, adding, to an icon of the second device in the device list interface, a mark indicating that package deployment fails, and outputting preset prompt information.

Before a package is distributed and deployed, it is required to determine whether each device that completes registration and connection meets the package distribution and deployment condition, for example, whether an adapted package is ready, and whether the device can normally receive and run a package in a status of the device. Then, a package adapted to a device that meets the condition is distributed to the device. For a device that does not meet the condition, a corresponding package cannot be distributed and deployed. In this case, the device may wait until meeting the condition, and output corresponding prompt information.

Specifically, the determining whether any of the plurality of devices meets a preset package distribution and deployment condition may include:

obtaining a device identification code of a target device, where the target device is any of the plurality of devices;

searching a specified storage path for a package corresponding to the device identification code;

if the package corresponding to the device identification code is found from the storage path, and status information of the target device is a normal state, determining that the target device meets the package distribution and deployment condition; and if the package corresponding to the device identification code is not found from the storage path, or the status information of the target device is an abnormal state, determining that the target device does not meet the package distribution and deployment condition.

In a possible implementation of the first aspect, the distributing and deploying a package adapted to the first device to the corresponding first device may include:

if a first operation instruction is received, distributing and deploying the adapted package to all first devices; and if a second operation instruction is received, selecting at least one device from the first device, and distributing and deploying the adapted package to the at least one selected device.

For example, in the constructed IDE tool, a "one-click distribution" operation button may be set. A user only needs to click this button to distribute and deploy a corresponding package to all devices that meet the package distribution and deployment condition. Alternatively, the user may select one or more devices that meet the package distribution and deployment condition, to distribute and deploy a corresponding package to the selected device. Through this setting, a package distribution and deployment operation can be flexibly and conveniently completed.

In a possible implementation of the first aspect, after the distributing and deploying a found package to a corresponding device, the package deployment method may further include:

receiving a debugging and running result of each of the devices for a package deployed on the device; and adding the debugging and running result to the device list interface of the IDE tool.

After each package is distributed and deployed to each corresponding device, to help view the debugging and running result for the package on each device, the received debugging and running result may be added to the device list interface of the IDE tool.

According to a second aspect, an embodiment of this application provides a package deployment apparatus, including:

a package searching module, configured to search, for a plurality of registered devices, for a package adapted to each of the plurality of devices, where a registration operation of the plurality of devices is completed by using a pre-constructed integrated development environment (IDE) tool; and a package deployment module, configured to distribute and deploy a found package to a corresponding device, where the corresponding device is a device in the plurality of devices.

Further, the package deployment apparatus may include:

a communication establishment module, configured to establish communications connection to the plurality of devices by using the IDE tool;

a status information receiving module, configured to: after the communications connection is successfully established, receive status information of each of the plurality of devices; and a status information display module, configured to display the received status information in a device list interface of the IDE tool to complete the registration operation.

Further, the package deployment module may include:

a condition determining unit, configured to determine whether each of the plurality of devices meets a preset package distribution and deployment condition; and a package deployment unit, configured to: for a first device in the plurality of devices that meets the package distribution and deployment condition, distribute and deploy a package adapted to the first device to the corresponding first device.

Further, the condition determining unit may include:

a device identification code obtaining subunit, configured to obtain a device identification code of a target device, where the target device is any of the plurality of devices;

a package searching subunit, configured to search a specified storage path for a package corresponding to the device identification code;

a first determining subunit, configured to: if the package corresponding to the device identification code is found from the storage path, and status information of the target device is a normal state, determine that the target device meets the package distribution and deployment condition; and a second determining subunit, configured to: if the package corresponding to the device identification code is not found from the storage path, or the status information of the target device is an abnormal state, determine that the target device does not meet the package distribution and deployment condition.

Further, the package deployment module may include:

a prompt information output unit, configured to: for a second device in the plurality of devices that does not meet the package distribution and deployment condition, add, to an icon of the second device in the device list interface, a mark indicating that package deployment fails, and output preset prompt information.

Further, the package deployment unit may include:

a first package deployment subunit, configured to: if a first operation instruction is received, distribute and deploy the adapted package to all first devices; and a second package deployment subunit, configured to: if a second operation instruction is received, select at least one device from the first device, and distribute and deploy the adapted package to the at least one selected device.

Further, the package deployment apparatus may include:

a running result receiving module, configured to receive a debugging and running result of each of the devices for a package deployed on the device; and a running result addition module, configured to add the debugging and running result to the device list interface of the IDE tool.

According to a third aspect, an embodiment of this application provides a terminal device, including a memory, a processor, and a computer program that is stored in the memory and that can be run on the processor. When executing the computer program, the processor implements the package deployment method proposed in the first aspect of the embodiments of this application.

According to a fourth aspect, an embodiment of this application provides a computer-readable storage medium. The computer-readable storage medium stores a computer program, and when the computer program is executed by a processor, the package deployment method proposed in the first aspect of the embodiments of this application is implemented.

According to a fifth aspect, an embodiment of this application provides a computer program product. When the computer program product is run on a terminal device, the terminal device is enabled to perform the package deployment method according to any item of the first aspect.

Compared with the conventional technology beneficial effects of the embodiments of this application lie in the following: A package can be simultaneously deployed to a plurality of different devices, to reduce operation difficulty of package deployment when a plurality of devices simultaneously participate in debugging, and improve efficiency and reliability of package deployment, so that the embodiments of this application have relatively strong usability and practicability.

DESCRIPTION OF EMBODIMENTS

Figure 1:
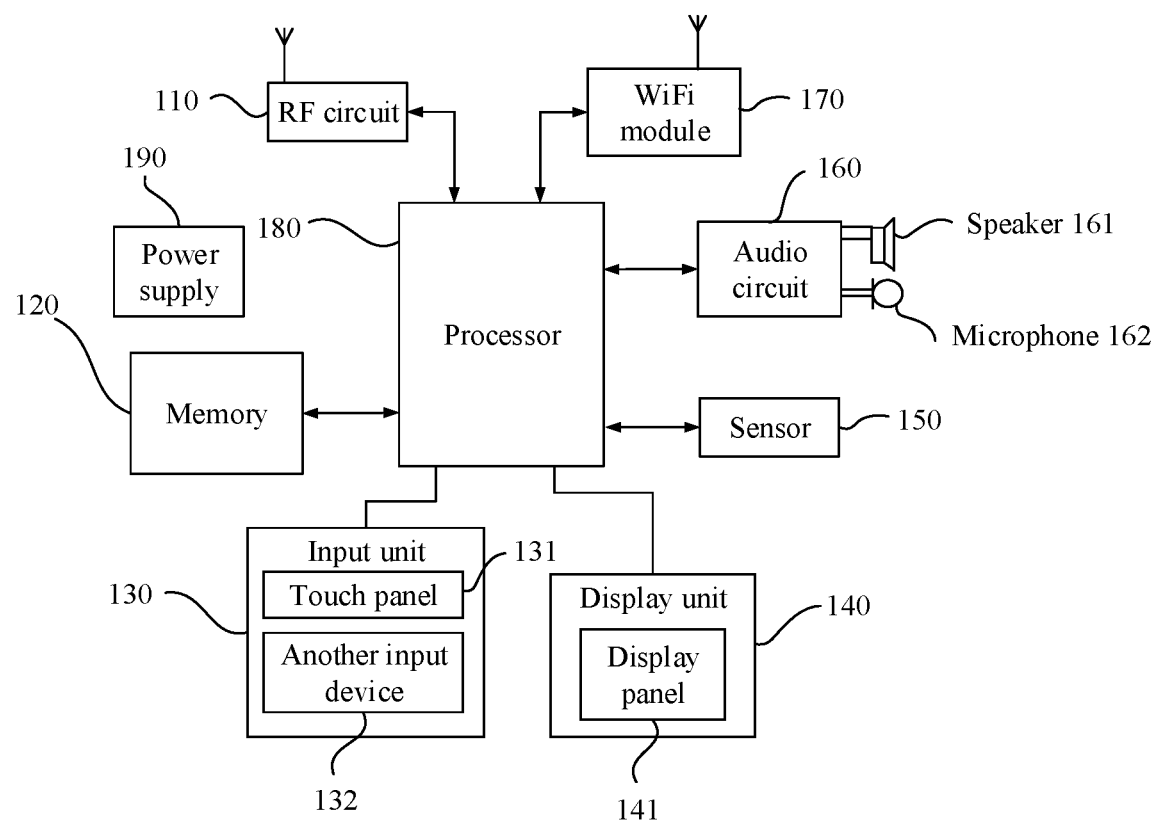
FIG. 1 is a schematic diagram of a hardware structure of a mobile phone to which a package deployment method is applicable according to an embodiment of this application.

In the following description, to illustrate rather than limit, specific details such as a particular system structure, and a technology are provided to make a thorough understanding of embodiments of this application. However, a person skilled in the art should know that this application may be implemented in other embodiments without these specific details. In other cases, detailed descriptions of well-known systems, apparatuses, circuits, and methods are omitted, so that this application is described without being obscured by unnecessary details.

Terms used in the following embodiments are merely intended to describe specific embodiments, but are not intended to limit this application. As used in the specification and appended claims of this application, singular expressions "a", "a type", "the", "the foregoing", and "this" are intended to also include, for example, an expression form "one or more", unless otherwise stated in their context. It should be further understood that in the embodiments of this application, "one or more" refers to one, or two or more. "And/or" describes an association relationship between associated objects, and indicates that three relationships may exist. For example, A and/or B may indicate the following cases: Only A exists, both A and B exist, and only B exists, where A and B may be singular or plural. The character "I" usually indicates that associated objects are in an "or" relationship.

A package deployment method provided in the embodiments of this application may be applied to a terminal device or a server such as a mobile phone, a tablet computer, a wearable device, a vehicle-mounted device, an augmented reality (AR)/virtual reality (VR) device, a notebook computer, an ultra-mobile personal computer (UMPC), a netbook, or a personal digital assistant (PDA). Specific types of the terminal device and the server are not limited in the embodiments of this application.

For example, the terminal device may be a station (ST) in WLAN, or may be a cellular phone, a cordless phone, a session initiation protocol (SIP) phone, a wireless local loop (WLL) station, a personal digital assistant (PDA) device, a handheld device with a wireless communications function, a computing device or another processing device connected to a wireless modem, a vehicle-mounted device, an Internet of Vehicles terminal, a computer, a laptop computer, a handheld communications device, a handheld computing device, a satellite wireless device, a wireless modem card, a set top box (STB), a customer premise equipment (CPE), and/or another device configured to perform communication over a wireless system and a next generation communications system, such as a mobile terminal in a 5G network, or a mobile terminal in a future evolved public land mobile network (PLMN) network.

By way of example and not limitation, when the terminal device is a wearable device, the wearable device may alternatively be a generic term for wearable devices such as glasses, gloves, watches, clothes, and shoes that are developed based on intelligent design of daily wearing by using wearable technologies. The wearable device is a portable device that can be directly worn by a user or integrated into clothes or an accessory of the user. The wearable device is not merely a hardware device, but is used to implement a powerful function through software support, a data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

For example, the terminal device is a mobile phone. FIG. 1 is a block diagram of a partial structure of a mobile phone according to an embodiment of this application. Referring to FIG. 1, the mobile phone includes components such as a radio frequency (RF) circuit 110, a memory 120, an input unit 130, a display unit 140, a sensor 150, an audio circuit 160, a wireless fidelity (WiFi) module 170, a processor 180, and a power supply 190. A person skilled in the art may understand that the structure of the mobile phone shown in FIG. 1 does not constitute a limitation on the mobile phone, and may include more or fewer components than those shown in the figure, or combine some components, or have different component arrangements.

Each component of the mobile phone is specifically described below with reference to FIG. 1.

The RF circuit 110 may be configured to send and receive signals in an information sending and receiving process or a call process. Particularly, the RF circuit 110 receives downlink information from a base station, and then delivers the downlink information to the processor 180 for processing. In addition, the RF circuit sends uplink data to the base station. Generally, the RF circuit includes but is not limited to an antenna, at least one amplifier, a transceiver, a coupler, a low noise amplifier (LNA), a duplexer, and the like. In addition, the RF circuit 110 may further communicate with a network and other devices through wireless communication. The foregoing wireless communication may use any communications standard or protocol, including but not limited to a global system for mobile communications (GSM), a general packet radio service (GPRS), code division multiple access (CDMA), wideband code division multiple access (WCDMA), Long Term Evolution (LTE), an e-mail, a short messaging service (SMS), and the like.

The memory 120 may be configured to store a software program and a module, and the processor 180 runs the software program and the module that are stored in the memory 120, to execute various function applications of the mobile phone and process data. The memory 120 may mainly include a program storage area and a data storage area. The program storage area may store an operating system, an application program required by at least one function (for example, a sound playing function or an image playing function), and the like. The data storage area may store data (such as audio data or a phone book) and the like created based on use of the mobile phone. In addition, the memory 120 may include a high-speed random access memory, and may further include a non-volatile memory, such as at least one magnetic disk storage device, a flash memory device, or another volatile solid-state storage device.

The input unit 130 may be configured to receive input digit or character information and generate key signal input related to user setting and function control of the mobile phone 100. Specifically, the input unit 130 may include a touch panel 131 and another input device 132. The touch panel 131, also referred to as a touchscreen, may collect a touch operation performed by a user on or near the touch panel 131 (for example, an operation performed by the user on or near the touch panel 131 by using any suitable object or accessory such as a finger or a stylus), and drive a corresponding connection apparatus based on a preset program. Optionally, the touch panel 131 may include two parts: a touch detection apparatus and a touch controller. The touch detection apparatus detects a touch orientation of the user, detects a signal introduced by the touch operation, and transmits the signal to the touch controller. The touch controller receives touch information from the touch detection apparatus, converts the touch information into contact coordinates, and sends the contact coordinates to the processor 180, and can receive and execute a command sent by the processor 180. In addition, the touch panel 131 may be implemented by using a plurality of types such as a resistive type, a capacitive type, an infrared ray, and a surface acoustic wave. In addition to the touch panel 131, the input unit 130 may further include another input device 132. Specifically, the another input device 132 may include but is not limited to one or more of a physical keyboard, a function key (such as a volume control key or an on/off key), a trackball, a mouse, a joystick, and the like.

The display unit 140 may be configured to display information entered by the user or information provided for the user, and various menus of the mobile phone. The display unit 140 may include a display panel 141. Optionally, the display panel 141 may be configured in a form of a liquid crystal display (LCD), an organic light-emitting diode (OLED), or the like. Further, the touch panel 131 may cover the display panel 141. After detecting the touch operation on or near the touch panel 131, the touch panel 131 transmits the touch operation to the processor 180 to determine a type of a touch event. Then the processor 180 provides corresponding visual output on the display panel 141 based on the type of the touch event. In FIG. 1, the touch panel 131 and the display panel 141 are used as two independent components to implement input and output functions of the mobile phone. However, in some embodiments, the touch panel 131 and the display panel 141 may be integrated to implement the input and output functions of the mobile phone.

The mobile phone 100 may further include at least one sensor 150, such as an optical sensor, a motion sensor, and another sensor. Specifically, the optical sensor may include an ambient light sensor and a proximity sensor. The ambient light sensor may adjust brightness of the display panel 141 based on luminance of ambient light, and the proximity sensor may disable the display panel 141 and/or backlight when the mobile phone moves to an ear. As a type of the motion sensor, an accelerometer sensor may detect a magnitude of acceleration in each direction (usually three axes), and may detect a magnitude and a direction of gravity when being static. The accelerometer sensor may be used in an application (for example, landscape and portrait screen switching, a related game, or magnetometer posture calibration) used for identifying a mobile phone posture, and a vibration recognition related function (for example, a pedometer or a strike). For other sensors such as a gyroscope, a barometer, a hygrometer, a thermometer, and an infrared sensor that may be further configured on the mobile phone, details are not described herein.

The audio circuit 160, a speaker 161, and a microphone 162 may provide an audio interface between a user and a mobile phone. The audio circuit 160 may transmit, to the speaker 161, an electrical signal converted from received audio data, and the speaker 161 converts the electrical signal into a sound signal for output. In another aspect, the microphone 162 converts the collected sound signal into an electrical signal, and the audio circuit 160 receives the electrical signal, converts the electrical signal into audio data, then outputs the audio data to the processor 180 for processing, and sends processed audio data to, for example, another mobile phone through the RF circuit 110, or outputs the audio data to the memory 120 for further processing.

WiFi belongs to a short-range wireless transmission technology. The mobile phone may help, by using the WiFi module 170, the user to send and receive an e-mail, browse a web page, access streaming media, and the like, and provides the user with wireless broadband Internet access. Although FIG. 1 shows the WiFi module 170, it may be understood that the WiFi module 170 is not a mandatory component of the mobile phone 100, and may be omitted based on a requirement without changing essence of the present disclosure.

The processor 180 is a control center of the mobile phone and is connected to all parts of the entire mobile phone by using various interfaces and lines, and performs various functions of the mobile phone and process data by running or executing a software program and/or a module stored in the memory 120 and invoking data stored in the memory 120, to perform overall monitoring on the mobile phone. Optionally, the processor 180 may include one or more processing units. Preferably, the processor 180 may be integrated with an application processor and a modem processor. The application processor mainly processes an operating system, a user interface, an application program, and the like. The modem processor mainly processes wireless communication. It may be understood that the modem processor may not be integrated into the processor 180.

The mobile phone 100 further includes the power supply 190 (such as a battery) that supplies power to each component. Preferably, the power supply may be logically connected to the processor 180 by using a power management system, to implement functions such as charging management, discharging management, and power consumption management by using the power management system.

Although not shown, the mobile phone 100 may further include a camera. Optionally, a location of the camera on the mobile phone 100 may be front-facing, or may be rear-facing, which is not limited in this embodiment of this application.

Optionally, the mobile phone 100 may include a single camera, dual cameras, three cameras, or the like, which is not limited in this embodiment of this application.

For example, the mobile phone 100 may include three cameras, one of which is a main camera, one of which is a wide-angle camera, and one of which is a long-focus camera.

Optionally, when the mobile phone 100 includes a plurality of cameras, the plurality of cameras may be all front-facing or all rear-facing; or some cameras are front-facing, and the other cameras are rear-facing, which is not limited in this embodiment of this application.

In addition, although not shown, the mobile phone 100 may further include a Bluetooth module and the like, and details are not described herein.

The package deployment method proposed in this application is completed by using a pre-constructed IDE tool. The IDE is an application program used to provide a program development environment, usually includes tools such as a code editor, a compiler, a debugger, and a graphical user interface, and integrates integrated development functions such as code writing, code compiling, and code debugging. Currently, popular terminal-side IDEs include Android Studio from Google Inc. and XCode from Apple Inc. These two tools can only enable a single device to distribute (deploy and install) a debugging package to a device such as a mobile phone though a USB connection line or Wifi.

To construct a programming framework oriented toward a next-generation new application, to greatly reduce development difficulty and a technical barrier, and provide a developer with better development experience, this application proposes an IDE that supports functions of designing, developing, constructing, and publishing an APP in a cross-device scenario. With only one development activity, the APP can be adapted to and run on a plurality of devices, so that a development activity of the developer is simpler and more efficient, to reduce subsequent operation costs.

In a multi-end adaptation development scenario, a plurality of packages may be obtained by compiling one APP based on different device screen sizes and interaction logic, to separately adapt to different devices. For example, an application in code engineering currently simultaneously supports three types of devices: a mobile phone, a Pad, and a large-screen television. During debugging, three types of program installation packages need to be compiled to respectively adapt to the three types of devices, and the program installation packages need to be efficiently distributed to the three types of real devices, to view a program running effect on the three types of devices. The IDE needs a mechanism that can support identifying a currently available debugging device in a development and debugging process, and distributing and deploying a package that can be run to a debugging device matching the package, to complete running debugging of a plurality of devices in a distributed scenario. The IDE proposed in this application has this mechanism.

Figure 2:
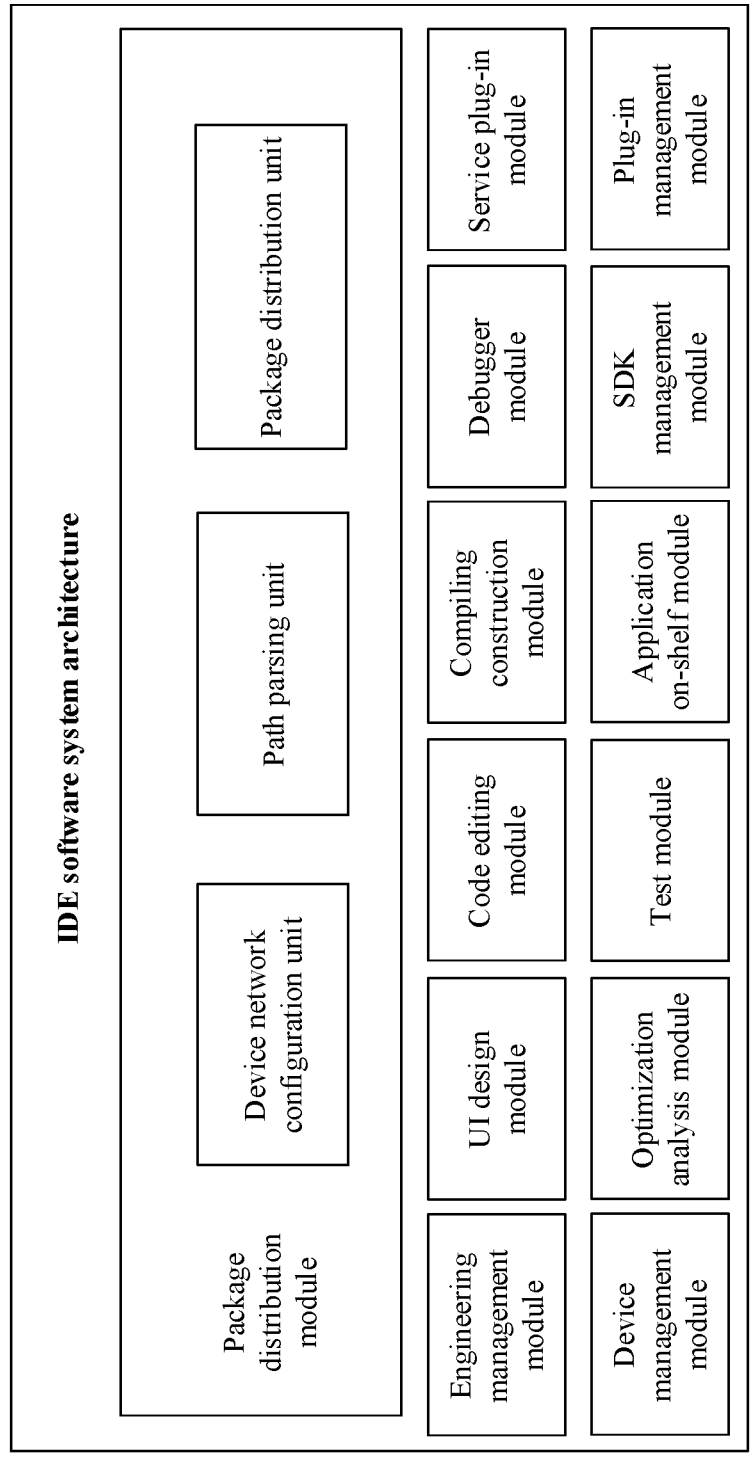
FIG. 2 is an architectural diagram of a software system of an IDE tool constructed in an embodiment of this application.

FIG. 2 is an architectural diagram of a software system of an IDE tool constructed in an embodiment of this application. In the architectural diagram of the system, a package distribution module is responsible for distributing (deploying and installing) a package to each end-side device based on information provided by engineering management and compiling construction; and the module may specifically include three functional units: a device network configuration unit, a path parsing unit, and a package distribution unit, which are respectively configured to set a network between devices, parse a storage path of a package, and execute functions such as package distribution and deployment.

An engineering management module is responsible for maintaining and providing information related to a device adapted to a code directory. A UI design module is responsible for designing a UI interface design an IDE tool. A code editing module provides functions for code developing and editing. A compiling construction module may generate a distributable package through compiling based on Gradle setting. A debugger module is configured to provide a code debugging function. A service plug-in module provides a related plug-in that meets various service requirements. A device management module is configured to configure and manage each external device connected to the IDE. An optimization analysis module can optimize and analyze written code. A test module is configured to test code. An application on-shelf module is configured to perform a related procedure required during application on-shelf. An SDK management module is configured to manage and maintain a software development installation package. A plug-in management module is configured to manage various related plug-ins.

A process of developing and generating a package by using the IDE tool is usually as follows.

(1) A developer selects, by using the IDE, an engineering type (an adapted specific end-side device, such as a mobile phone, a Pad, and a large-screen television) that meets a service target of the developer.

(2) The developer selects a compiler that meets the service target of the developer. The compiler may come from a third party. As long as the compiler meets an IDE integration interface specification, the compiler can be visually integrated with the IDE through hooking by using an IDE interface. The compiler provides syntax compiling support for programming language. To be specific, a computer may translate, by using the compiler, code developed by the developer into a binary machine code that can be identified by the computer.

(3) The developer writes, in the IDE by using programming language such as Java supported by the compiler, an interface (interface elements such as an interface layout and an interface control) and service logic (implemented by an interface, a class, and the like) that are of an APP. These interfaces and service logic are adapted to the engineering type selected in the previous step.

(4) When code written by the developer can be successfully compiled by using the compiler, and there is no compiling error, an APP function can be verified.

(5) APP function verification mainly means running, on an end-side device (a mobile phone, a Pad, and a large-screen television), a binary program installation package generated through compiling, to verify whether the APP meets a code writing target expected to be achieved, for example, whether a size, a color, and a location of the interface control meet expectations, and whether service processing logic such as an input value range meets an expectation. High level language such as Java developed by the developer is translated, by using the compiler by using a computer compiling principle, into the binary machine code that can be identified and executed by the computer. The binary installation package of the APP includes the binary machine code. It should be noted that packages (binary) generated for different end-side devices through compiling are different, and are respectively adapted to underlying APIs of different devices.

(6) After program installation packages are successfully compiled, these program installation packages are stored in a hard disk of a terminal device used by the developer.

The following embodiments may be implemented on a terminal device or a server with the foregoing hardware structure/software structure.

Figure 3:
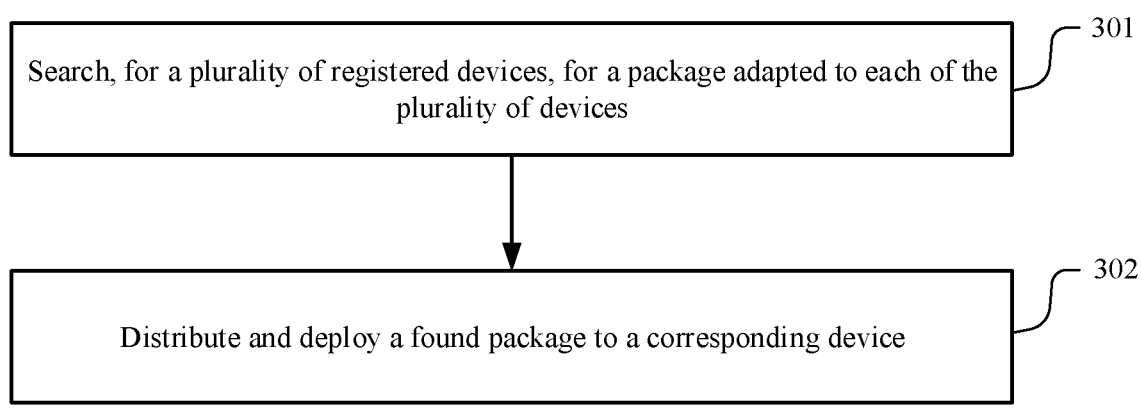
FIG. 3 is a flowchart of a package deployment method according to an embodiment of this application.

FIG. 3 is a flowchart of a package deployment method according to this application. The method includes the following steps.

301. Search, for a plurality of registered devices, for a package adapted to each of the plurality of devices.

A registration operation of the plurality of devices is completed by using a pre-constructed integrated development environment (IDE) tool. For a specific description of the IDE tool, refer to the foregoing content. A plurality of devices on different terminal sides may perform a registration operation in the IDE tool by using a network or in another communications manner. Each device registered herein participates in receiving of a program installation package. To be specific, the device obtains a distributed package, and automatically deploys the package on the device. The plurality of devices may be various types of devices with an unlimited quantity, such as a mobile phone, a Pad, or a large-screen television.

After a registration and connection operation is completed, the package adapted to each of the plurality of devices is searched for. Packages adapted to different devices are different, and are respectively adapted to underlying APIs of different devices. Therefore, it is required to search for the package adapted to each device. Specifically, a corresponding device identifier may be added to each generated package, to indicate a device adapted to the package. For example, a device identifier of a mobile phone is added to a package adapted to a mobile phone device. After being developed by using the IDE tool, each package may be stored in a specific storage path, so that in step 301, the storage path can be searched for each package.

302. Distribute and deploy a found package to a corresponding device.

Finally, the found package is distributed and deployed to the corresponding device. The corresponding device is a device in the plurality of devices. To be specific, a package adapted to a mobile phone is distributed and deployed to a mobile phone device, a package adapted to a Pad is distributed and deployed to a Pad device, and so on. The IDE tool is in communications connection to the plurality of devices, and therefore, a plurality of found packages may be separately and simultaneously deployed to various different devices.

A conventional IDE tool each time can be connected to only a single device through a USB connection line or Wifi. After deploying a package to the device, the IDE tool is disconnected from the device and is ready to be connected to a next device. However, in this application, the constructed IDE tool each time can register with and be connect to a plurality of different devices; searches, for the plurality of registered devices, for a package adapted to each device; and then distributes and deploys a found package to each corresponding device, so that the package is simultaneously deployed to the plurality of different devices, to effectively improve efficiency of package deployment.

Figure 4:
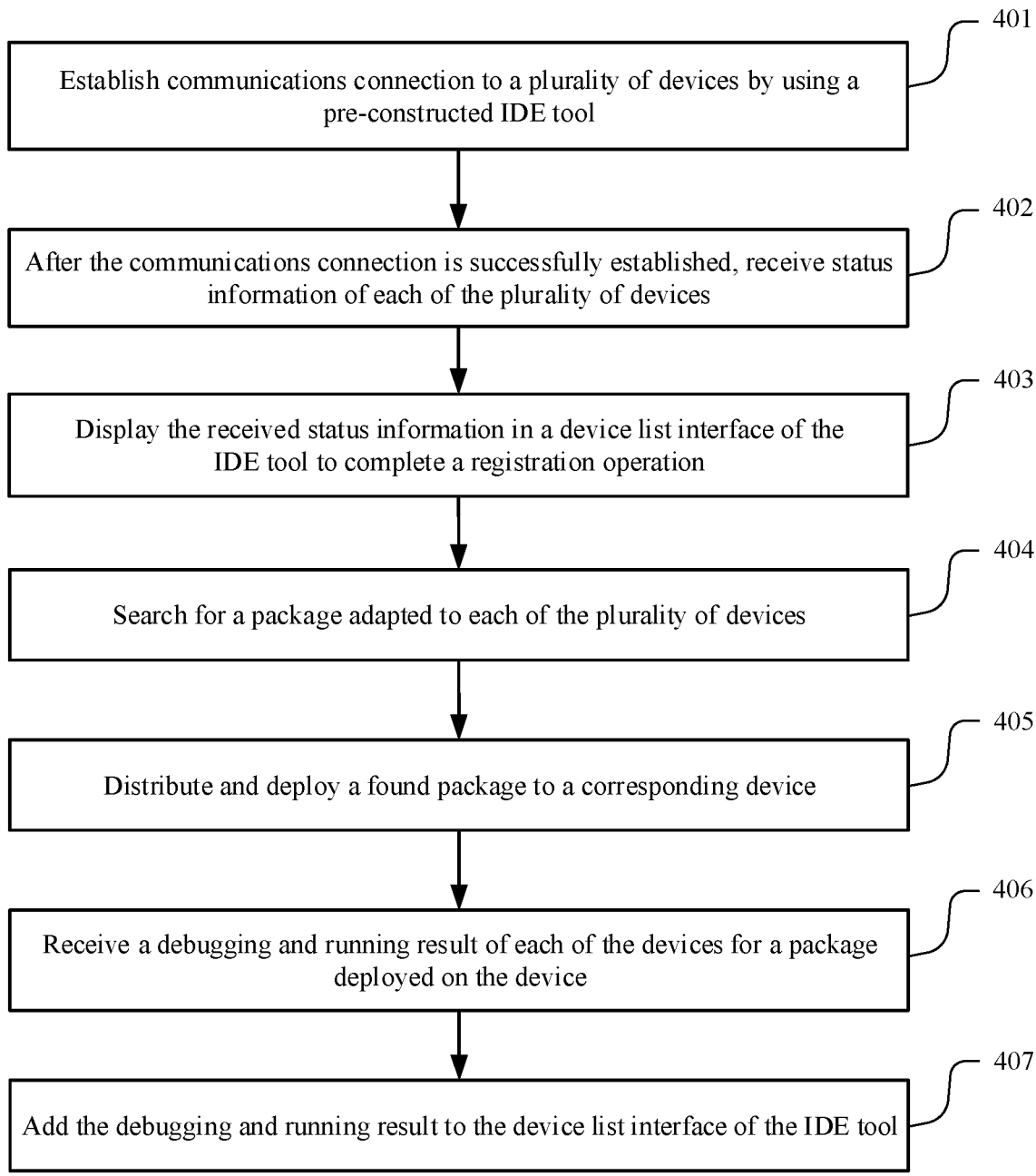
FIG. 4 is a flowchart of another package deployment method according to an embodiment of this application.

FIG. 4 is a flowchart of another package deployment method according to an embodiment of this application. The method includes the following steps.

401. Establish communications connection to a plurality of devices by using a pre-constructed IDE tool.

For a specific description of the IDE tool, also refer to the foregoing content. A plurality of different devices on different terminal sides may establish a communications connection relationship with the IDE tool by using a network or in another communications manner.

402. After the communications connection is successfully established, receive status information of each of the plurality of devices.

After the communications connection relationship is established, a terminal device or a server to which the IDE is applied may receive status information of each of the plurality of devices, for example, a name and a model of the device, whether the device is normal, and whether the device accepts a package.

403. Display the received status information in a device list interface of the IDE tool to complete a registration operation.

Then, the received status information may be displayed in the device list interface of the IDE tool to complete the registration operation, so that debugging personnel can visually discover information related to each device participating in package deployment and debugging. Specifically, the device list interface may include various types of information such as a name, a model, a communications status, a power status, a connection manner, and registration and connection time that are of a registered device.

404. Search for a package adapted to each of the plurality of devices.

Steps 401 to 403 are equivalent to completing the registration operation of each device in the IDE tool. Next, the package adapted to each of the plurality of devices is searched for. For a specific package searching manner, refer to a related description in step 301.

405. Distribute and deploy a found package to a corresponding device.

Then, the found package is distributed and deployed to the corresponding device. For a specific description, refer to step 302.

Figure 5:
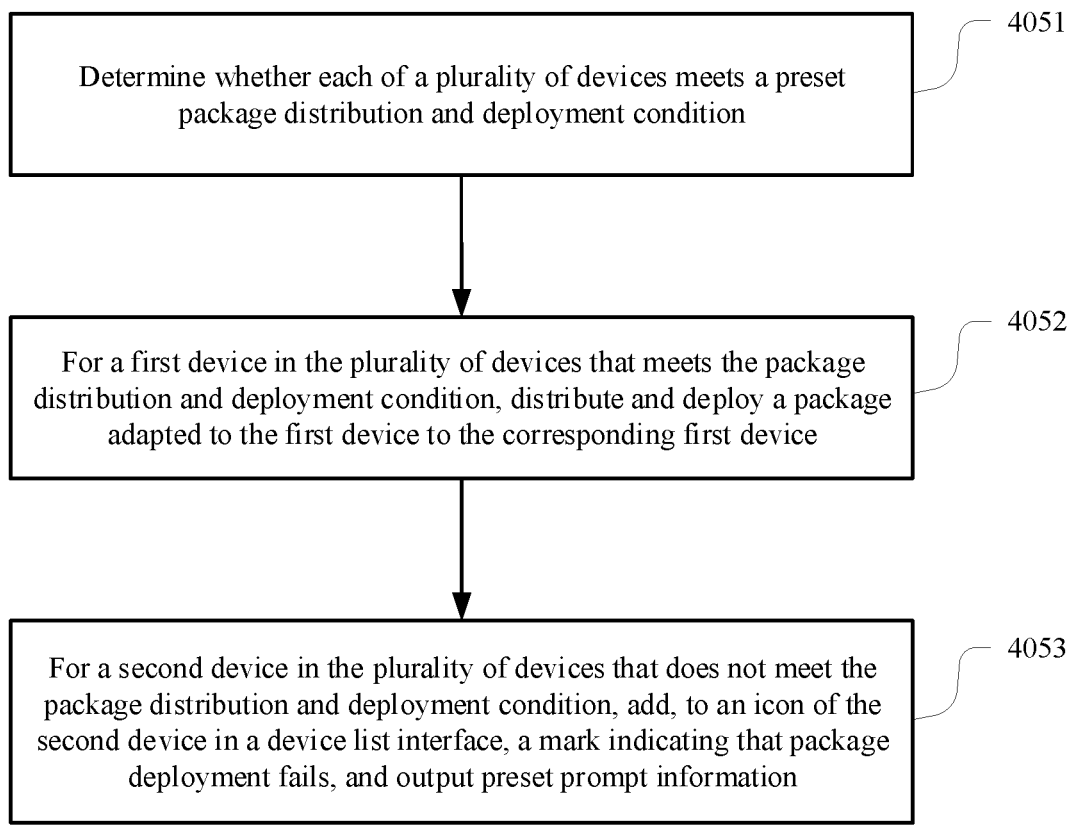
FIG. 5 is a flowchart of a specific implementation of step 405 in FIG. 4.

Further, as shown in FIG. 5, step 405 may include the following steps 4051 to 4053.

4051. Determine whether each of the plurality of devices meets a preset package distribution and deployment condition.

When a package is distributed and deployed to each device, it is first required to determine whether each device meets the preset package distribution deployment condition, for example, whether a current status of connection between the device and the IDE is normal, whether the device can receive a package in the current status, and whether a package adapted to the device is generated.

Figure 6:
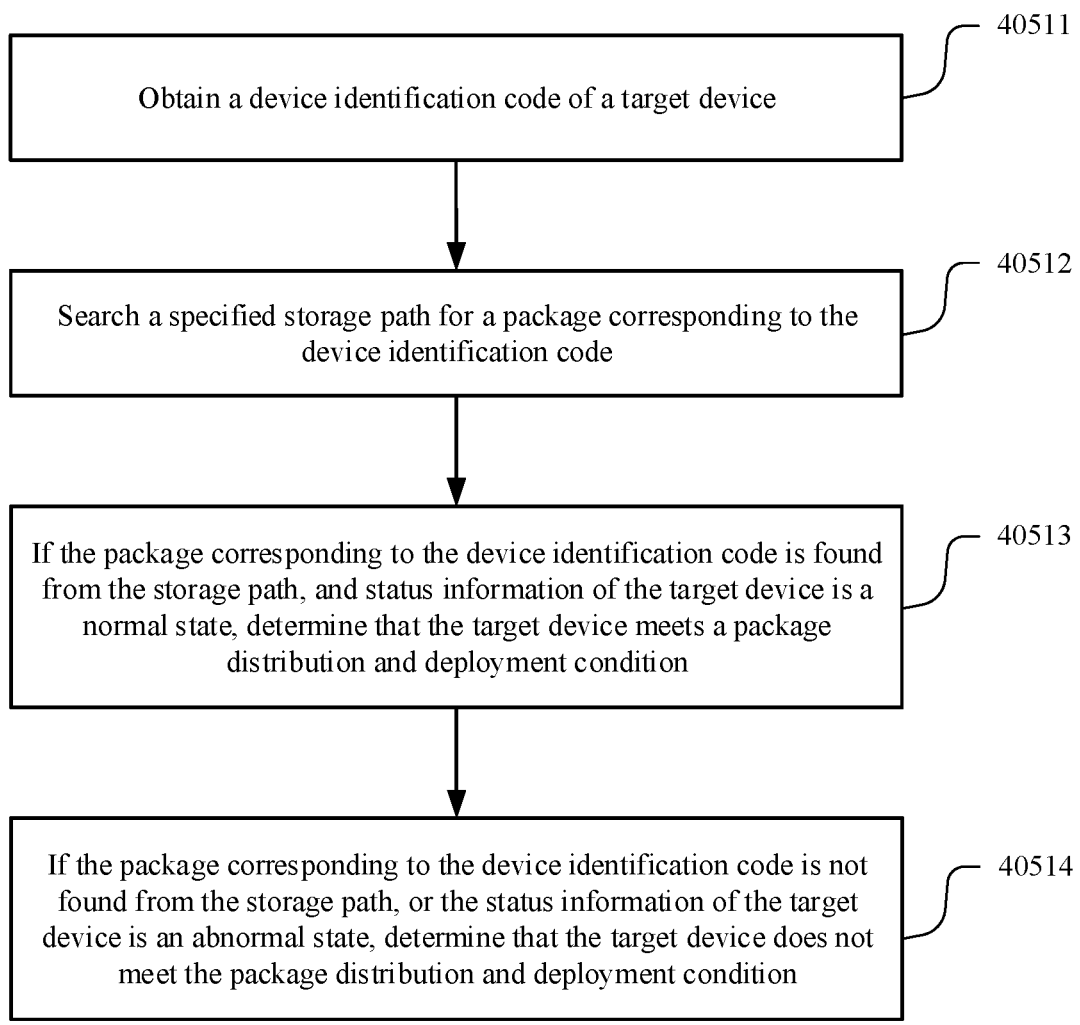
FIG. 6 is a flowchart of a specific implementation of step 4051 in FIG. 5.

Specifically, as shown in FIG. 6, whether any target device in the plurality of devices meets the package distribution and deployment condition may be determined by using the following steps.

40511. Obtain a device identification code of the target device.

40512. Search a specified storage path for a package corresponding to the device identification code.

40513. If the package corresponding to the device identification code is found from the storage path, and status information of the target device is a normal state, determine that the target device meets the package distribution and deployment condition.

40514. If the package corresponding to the device identification code is not found from the storage path, or the status information of the target device is an abnormal state, determine that the target device does not meet the package distribution and deployment condition.

Assuming that the target device is a mobile phone, a device identification code of the mobile phone is first obtained, and then a specified storage path (the storage path is a default storage path of each package after various different types of packages are developed and generated by using the IDE tool) is searched for a package corresponding to the device identification code. If the package corresponding to the device identification code of the mobile phone can be found from the storage path, and all status information of the mobile phone is normal, for example, the mobile phone has a normal power supply, has normal communications connection, and is in a state in which the mobile phone can accept a package, it may be determined that the mobile phone meets the package distribution and deployment condition. On the contrary, if the package corresponding to the device identification code of the mobile phone is not found from the storage path, or specific status information of the mobile phone is abnormal, it may be determined that the mobile phone does not meet the package distribution and deployment condition.

4052. For a first device in the plurality of devices that meets the package distribution and deployment condition, distribute and deploy a package adapted to the first device to the corresponding first device.

After the first device in the plurality of devices that meets the package distribution and deployment condition is found in step 4051, the packages adapted to these devices are distributed and deployed to these devices.

Figure 7:
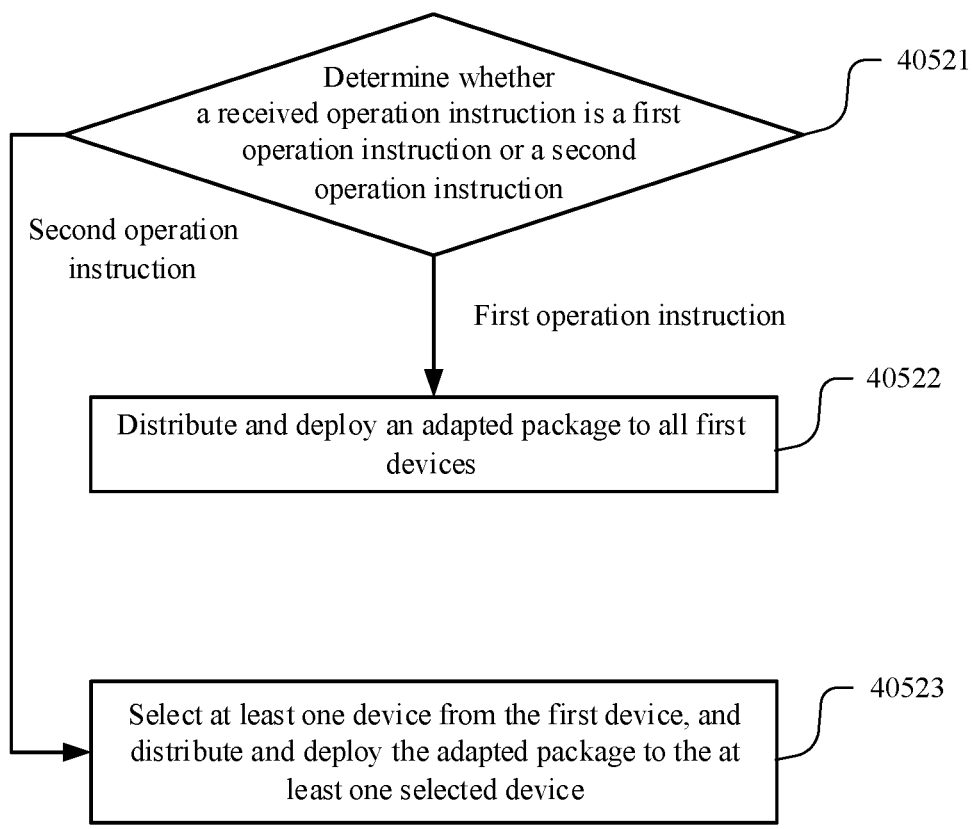
FIG. 7 is a flowchart of a specific implementation of step 4052 in FIG. 5.

Specifically, as shown in FIG. 7, that the package adapted to the first device is distributed and deployed to the first device may include the following steps.

40521. Determine whether a received operation instruction is a first operation instruction or a second operation instruction.

If the first operation instruction is received, step 40522 is performed; or if the second operation instruction is received, step 40523 is performed.

40522. Distribute and deploy the adapted package to all first devices.

40523. Select at least one device from the first device, and distribute and deploy the adapted package to the at least one selected device.

In the IDE, a plurality of different package distribution and deployment manners may be set based on an actual requirement. For example, a "one-click distribution" operation button may be set. A user only needs to click this button to distribute and deploy a corresponding package to all devices that meet the package distribution and deployment condition. Alternatively, the user may select, from the device list interface, one or more devices that meet the package distribution and deployment condition, to distribute and deploy a corresponding package to the selected device. It should be understood that there may be a plurality of manners in which the user enters the first operation instruction and the second operation instruction, for example, single-clicking or double-clicking a specific button, dragging a specific window or scroll bar, which is not specifically limited. Through this setting, a package distribution and deployment operation can be flexibly and conveniently completed.

4053. For a second device in the plurality of devices that does not meet the package distribution and deployment condition, add, to an icon of the second device in the device list interface, a mark indicating that package deployment fails, and output preset prompt information.

For a device that does not meet the package distribution and deployment condition, a corresponding package cannot be distributed and deployed. In this case, the device may wait until meeting the condition. In addition, the mark indicating that package deployment fails (or a package cannot be deployed temporarily) may be added to an icon of the device in the device list interface of the IDE, and the preset prompt information is output, to notify related personnel of the package deployment failure information. In addition, a reason for a package deployment failure may be shown, for example, an adapted package is not generated, or communications connection of the device is abnormal. Through this setting, in the device list interface of the IDE, not only each device participating in package deployment and debugging can be visually discovered, but also a specific device that meets the package distribution and deployment condition and a specific device that does not meet the package distribution and deployment condition can be visually identified.

406. Receive a debugging and running result of each of the devices for a package deployed on the device.

407. Add the debugging and running result to the device list interface of the IDE tool.

After each package is distributed and deployed to each corresponding device, to help view the debugging and running result for the package on each device, the debugging and running result (for example, running succeeds or running fails) received from each device may be also added to the device list interface of the IDE tool.

In this embodiment of this application, the constructed IDE tool may complete a registration and connection operation of a plurality of devices. To be specific, the constructed IDE tool each time can be connected to a plurality of different devices, automatically detects registered devices that meet the package distribution and deployment condition, and distributes and deploys a found package to these devices, so that the package is simultaneously deployed to the plurality of different devices, to reduce operation difficulty of package deployment when a plurality of devices simultaneously participate in debugging, and improve reliability.

It should be understood that sequence numbers of the steps do not mean an execution sequence in the foregoing embodiments. The execution sequence of the processes should be determined based on functions and internal logic of the processes, and should not constitute any limitation on the implementation processes of the embodiments of this application.

For ease of understanding, the package deployment method proposed in this application is described below by using several practical application scenarios.

Figure 8:
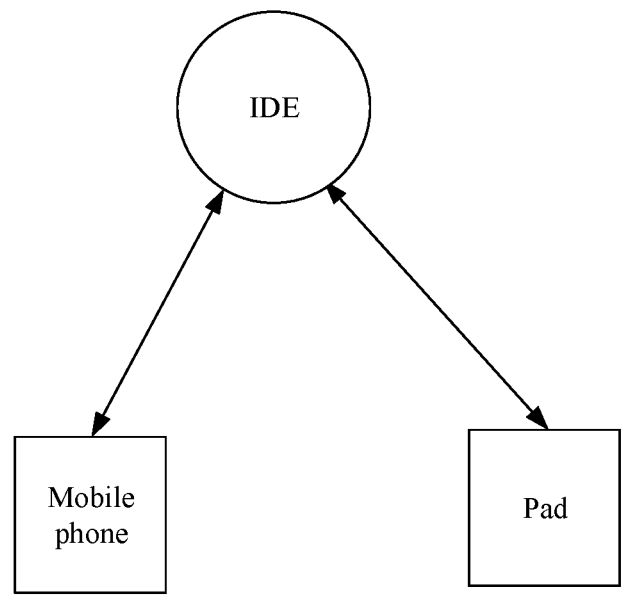
FIG. 8 is a schematic diagram of a practical application scenario of a package deployment method according to an embodiment of this application.

Scenario 1: As shown in FIG. 8, a terminal device in which the IDE is located needs to distribute and deploy a debugging package to one mobile phone and one Pad.

Based on this application scenario 1, key operations that a user needs to perform in the IDE are as follows.

(1) In the IDE, the user selects an engineering template that simultaneously supports a mobile phone and a Pad.

(2) The user writes, in the engineering template, an interface and service logic of an APP that are adapted to the mobile phone and the Pad.

(3) The user uses the compiler of the IDE to separately generate debugging packages of the mobile phone and the Pad through compiling.

(4) The user registers and connects one mobile phone device and one Pad device with/to a device registration function of the IDE.

(5) The user clicks the "one-click distribution" button to distribute and deploy a debugging package adapted to a mobile phone device to the mobile phone device, and distribute and deploy a debugging package adapted to a Pad device to the Pad device.

(6) The user debugs and runs the deployed package on the mobile phone device and the Pad device, to complete a test function.

After the user clicks the "one-click distribution" button, the IDE searches a specified storage path for a mobile phone debugging package and a Pad debugging package that are generated through compiling, and respectively deploys the found packages to the mobile phone device and the Pad device.

Figure 9:
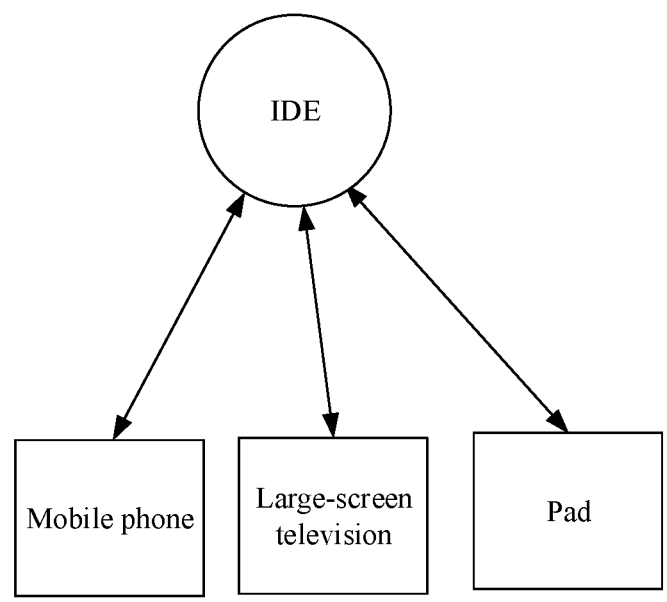
FIG. 9 is a schematic diagram of another practical application scenario of a package deployment method according to an embodiment of this application.

Scenario 2: As shown in FIG. 9, a terminal device in which the IDE is located needs to distribute and deploy a debugging package to one mobile phone, one Pad, and one large-screen television.

Based on this application scenario 2, key operations that a developer needs to perform in the IDE are as follows.

(1) In the IDE, the developer selects an engineering template that simultaneously supports a mobile phone, a Pad, and a large-screen television.

(2) The developer writes, in the engineering template, an interface and service logic of an APP that are adapted to the mobile phone, the Pad, and the large-screen television.

(3) The developer uses the compiler of the IDE to separately generate debugging packages of the mobile phone, the Pad, and the large-screen television through compiling.

(4) The developer registers and connects one mobile phone device, one Pad device, and one large-screen television device with/to a device registration function of the IDE.

(5) The developer clicks the "one-click distribution" button to distribute and deploy a debugging package adapted to a mobile phone device to the mobile phone device, and distribute and deploy a debugging package adapted to a Pad device to the Pad device, and distribute and deploy a debugging package adapted to a large-screen television device to the large-screen television device.

(6) The developer debugs and runs the deployed package on the mobile phone device, the Pad device, and the large-screen television device, to complete a test function.

After the user clicks the "one-click distribution" button, the IDE searches a specified storage path for a mobile phone debugging package, a Pad debugging package, and a large-screen television device debugging package that are generated through compiling, and respectively deploys the found packages to the mobile phone device, the Pad device, and the large-screen television device.

Figure 10:
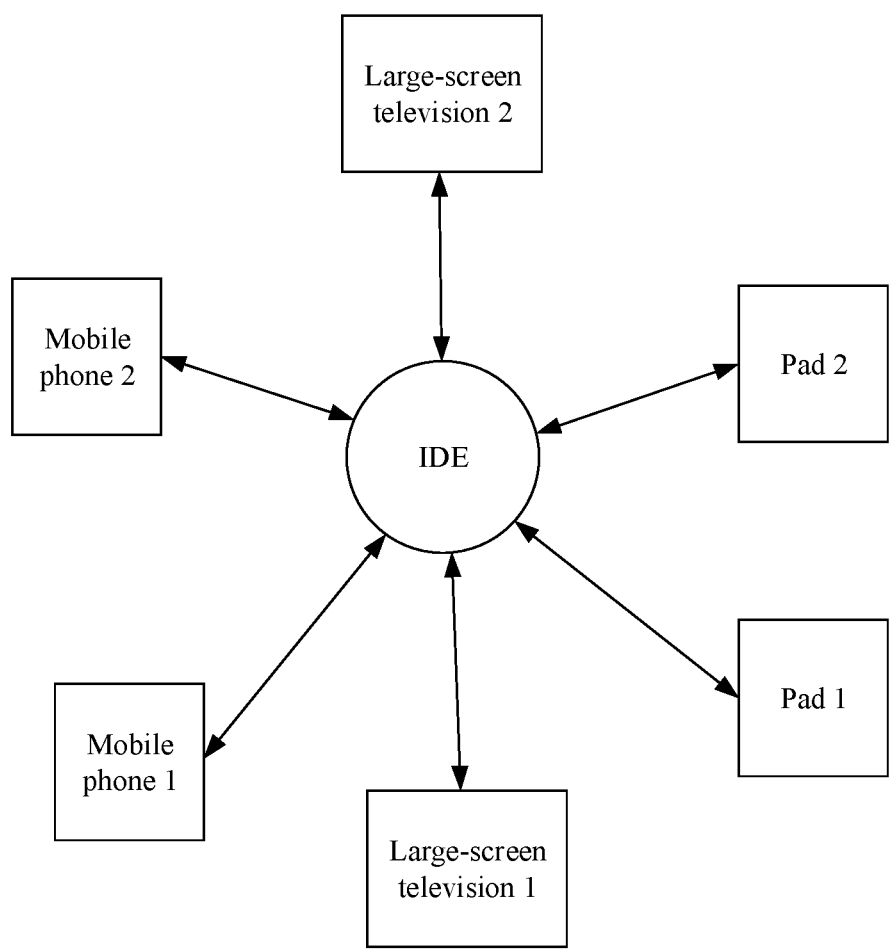
FIG. 10 is a schematic diagram of another practical application scenario of a package deployment method according to an embodiment of this application.

Scenario 3: As shown in FIG. 10, a terminal device in which the IDE is located needs to distribute and deploy debugging packages to two mobile phones, two Pads, and two large-screen television devices.

Based on this application scenario 3, key operations that a developer needs to perform in the IDE are as follows.

(1) In the IDE, the developer selects an engineering template that simultaneously supports a mobile phone, a Pad, and a large-screen television.

(2) The developer writes, in the engineering template, an interface and service logic of an APP that are adapted to the mobile phone, the Pad, and the large-screen television.

(3) The developer uses the compiler of the IDE to separately generate debugging packages of the mobile phone, the Pad, and the large-screen television through compiling.

(4) The developer registers and connects two mobile phone devices, two Pad devices, and two large-screen television devices with/to a device registration function of the IDE.

(5) The developer clicks the "one-click distribution" button to distribute and deploy a debugging package adapted to a mobile phone device to the two mobile phone devices, distribute and deploy a debugging package adapted to a Pad device to the two Pad devices, and distribute and deploy a debugging package adapted to a large-screen television device to the two large-screen television devices.

(6) The developer debugs and runs the deployed package on the two mobile phone devices, the two Pad devices, and the two large-screen television devices, to complete a test function.

After the user clicks the "one-click distribution" button, the IDE searches a specified storage path for a mobile phone debugging package, a Pad debugging package, and a large-screen television device debugging package that are generated through compiling, and respectively deploys the found packages to the two mobile phone devices, the two Pad devices, and the two large-screen television devices.

Figure 11:
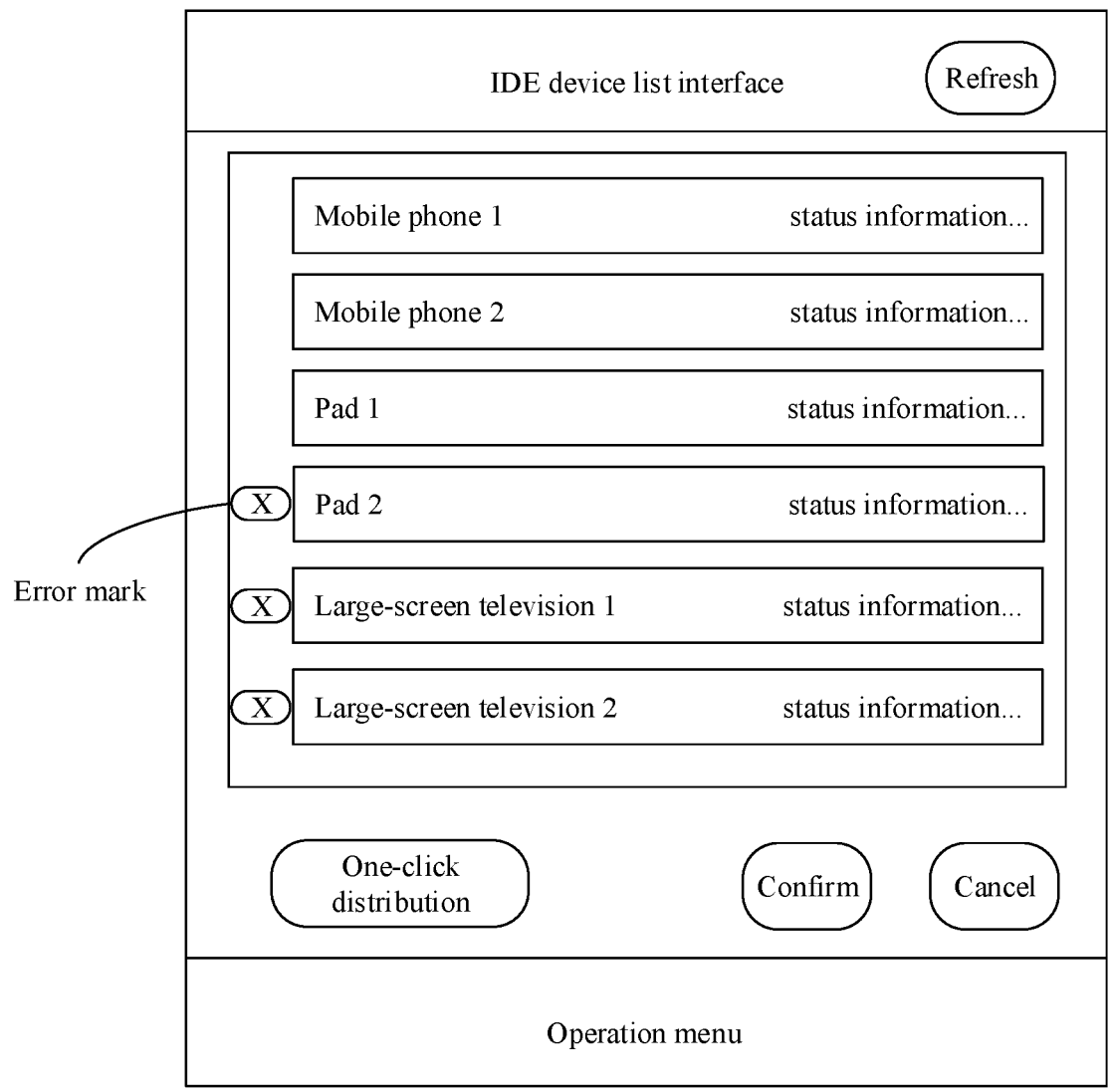
FIG. 11 is a schematic diagram of a device list interface of an IDE tool in a practical application scenario shown in FIG. 10.

It is assumed that in step (3), the debugging package of the large-screen television device fails to be generated (to be specific, the debugging package of the large-screen television device does not exist in the storage path), and after one of the Pad devices (Pad 2) is registered and connected, communication between the Pad device (Pad 2) and the IDE is interrupted. Then, when it is determined whether each registered device meets the package distribution and deployment condition, a result that "two mobile phone devices and one Pad device (Pad 1) meet the package distribution and deployment condition, and two large-screen television devices and one Pad device (Pad 2) do not meet the package distribution and deployment condition" is obtained. In this case, the device list interface of the IDE may be shown in FIG. 11. In the interface, the user may choose to distribute and deploy the debugging package to one or more of the two mobile phone devices and the Pad device (Pad 1). Alternatively, the user may click the "one-click distribution" button. In this case, the debugging package is simultaneously distributed and deployed to the two mobile phone devices and the Pad device (Pad 1). In addition, in the device list interface, for the two large-screen television devices and the Pad device (Pad 2) that do not meet the package distribution and deployment condition, an error mark used to indicate that a package cannot be deployed is added, and corresponding indication information (information such as a reason why the package cannot be deployed or corresponding operation suggestion) may be further displayed by clicking the error mark.

Figure 12:
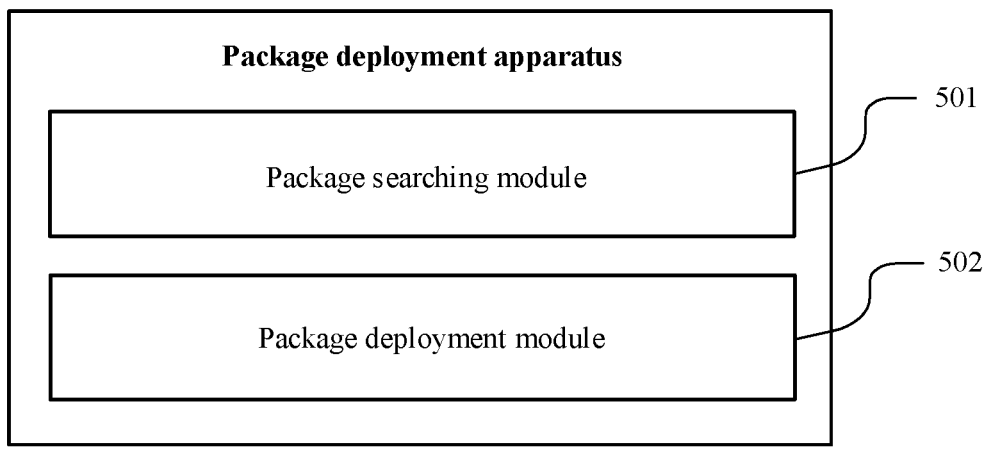
FIG. 12 is a diagram of a structure of an embodiment of a package deployment apparatus according to an embodiment of this application.

Corresponding to the package deployment method described in the foregoing embodiment, FIG. 12 is a block diagram of a structure of a package deployment apparatus according to an embodiment of this application. For ease of description, only a part related to the embodiments of this application is shown.

Referring to FIG. 12, the apparatus includes:
a package searching module 501, configured to search, for a plurality of registered devices, for a package adapted to each of the plurality of devices, where a registration operation of the plurality of devices is completed by using a pre-constructed integrated development environment (IDE) tool; and
a package deployment module 502, configured to distribute and deploy a found package to a corresponding device, where the corresponding device is a device in the plurality of devices.

Further, the package deployment apparatus may include:
a communication establishment module, configured to establish communications connection to the plurality of devices by using the IDE tool;
a status information receiving module, configured to: after the communications connection is successfully established, receive status information of each of the plurality of devices; and
a status information display module, configured to display the received status information in a device list interface of the IDE tool to complete the registration operation.

Further, the package deployment module may include:
a condition determining unit, configured to determine whether each of the plurality of devices meets a preset package distribution and deployment condition; and
a package deployment unit, configured to: for a first device in the plurality of devices that meets the package distribution and deployment condition, distribute and deploy a package adapted to the first device to the corresponding first device.

Further, the condition determining unit may include:
a device identification code obtaining subunit, configured to obtain a device identification code of a target device, where the target device is any of the plurality of devices;
a package searching subunit, configured to search a specified storage path for a package corresponding to the device identification code;
a first determining subunit, configured to: if the package corresponding to the device identification code is found from the storage path, and status information of the target device is a normal state, determine that the target device meets the package distribution and deployment condition; and
a second determining subunit, configured to: if the package corresponding to the device identification code is not found from the storage path, or the status information of the target device is an abnormal state, determine that the target device does not meet the package distribution and deployment condition.

Further, the package deployment module may include:
a prompt information output unit, configured to: for a second device in the plurality of devices that does not meet the package distribution and deployment condition, add, to an icon of the second device in the device list interface, a mark indicating that package deployment fails, and output preset prompt information.

Further, the package deployment unit may include:
a first package deployment subunit, configured to: if a first operation instruction is received, distribute and deploy the adapted package to all first devices; and
a second package deployment subunit, configured to: if a second operation instruction is received, select at least one device from the first device, and distribute and deploy the adapted package to the at least one selected device.

Further, the package deployment apparatus may include:
a running result receiving module, configured to receive a debugging and running result of each of the devices for a package deployed on the device; and
a running result addition module, configured to add the debugging and running result to the device list interface of the IDE tool.

An embodiment of this application further provides a computer-readable storage medium. The computer-readable storage medium stores a computer program, and when the computer program is executed by a processor, each step of the package deployment method proposed in this application is implemented.

An embodiment of this application further provides a computer program product. When the computer program product is run on a terminal device, the terminal device is enabled to perform each step of the package deployment method according to this application.

Figure 13:
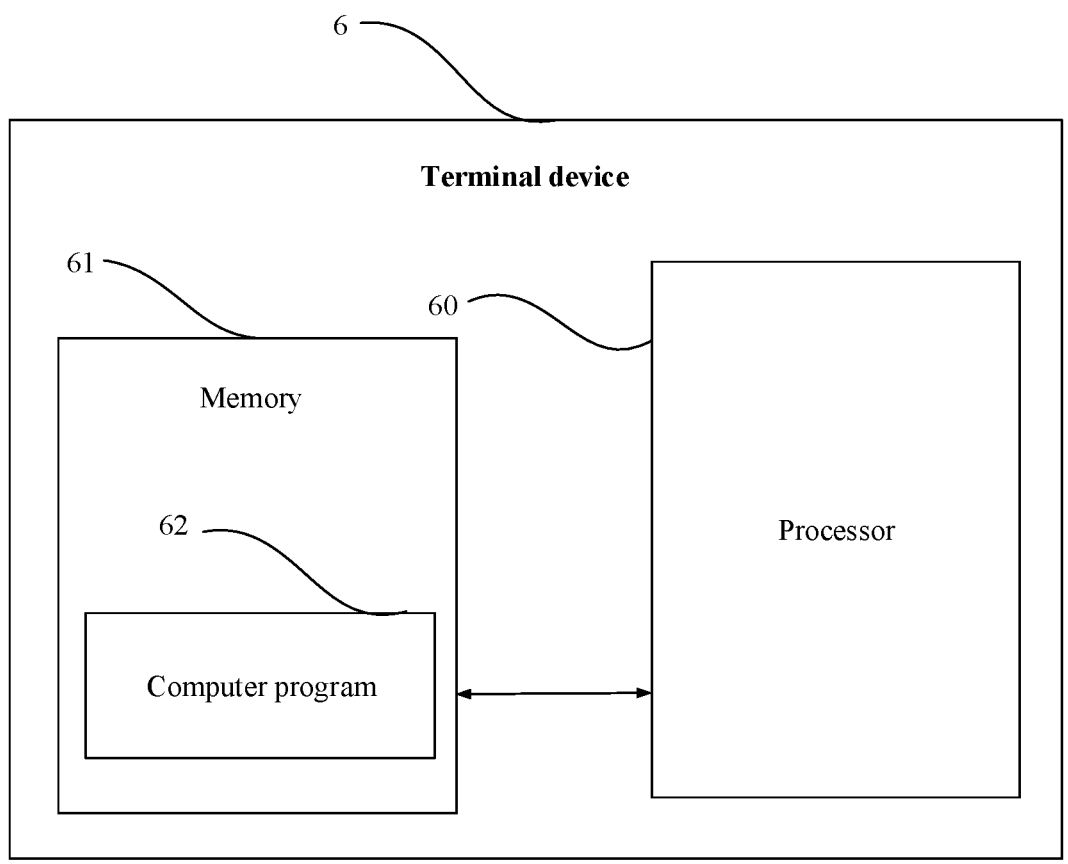
FIG. 13 is a schematic diagram of a terminal device according to an embodiment of this application.

FIG. 13 is a schematic diagram of a structure of a terminal device according to an embodiment of this application. As shown in FIG. 13, a terminal device 6 in this embodiment includes at least one processor 60 (only one processor is shown in FIG. 6), a memory 61, and a computer program 62 that is stored in the memory 61 and that can be run on the at least one processor 60. When executing the computer program 62, the processor 60 implements the steps in any of the foregoing package deployment method embodiments.

The terminal device 6 may be a computing device such as a desktop computer, a notebook, a palmtop computer, or a cloud server. The terminal device may include but is not limited to the processor 60 and the memory 61. A person skilled in the art may understand that FIG. 13 is merely an example of the terminal device 6, and does not constitute a limitation on the terminal device 6. The terminal device 6 may include more or fewer components than those shown in the figure, or combine some components, or have different components. For example, the terminal device 6 may further include an input/output device, a network access device, and the like.

The processor 60 may be a central processing unit (CPU). The processor 60 may alternatively be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

In some embodiments, the memory 61 may be an internal storage unit of the terminal device 6, such as a hard disk or memory of the terminal device 6. In some other embodiments, the memory 61 may be an external storage device of the terminal device 6, such as a plug-connected hard disk, a smart media card (SMC), a secure digital (SD) card, a flash card, or the like that is configured on the terminal device 6. Further, the memory 61 may further include the internal storage unit of the terminal device 6 as well as the external storage device. The memory 61 is configured to store an operating system, an application program, a bootloader, data, and another program, for example, program code of the computer program. The memory 61 may be further configured to temporarily store data that is output or that is to be output.

It may be clearly understood by a person skilled in the art that for ease and brevity of description, division of the foregoing functional units and modules is merely used as an example for description. In practical application, the foregoing functions may be allocated to different functional units and modules based on a requirement, to be completed. To be specific, an internal structure of the apparatus is divided into different functional units or modules, to complete all or some of the functions described above. Functional units and modules in the embodiments may be integrated into one processing unit, or each of the units may exist alone physically, or two or more units may be integrated into one unit. The integrated unit may be implemented in a form of hardware, or may be implemented in a form of a software functional unit. In addition, specific names of the functional units and modules are merely used to distinguish each other, and are not intended to limit the protection scope of this application. For a specific working process of the units and modules in the foregoing system, refer to a corresponding process in the foregoing method embodiments. Details are not described herein again.

In the foregoing embodiments, the description of each embodiment has respective focuses. For a part that is not described in detail or recorded in an embodiment, refer to related descriptions in other embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the embodiments provided in this application, it should be understood that the disclosed apparatus and method may be implemented in other manners. For example, the described apparatus embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate components may or may not be physically separate, and components displayed as units may or may not be physical units. To be specific, the components may be located at one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, in this application, all or some of the procedures of the methods in the foregoing embodiments may be implemented by a computer program instructing related hardware. The computer program may be stored in a computer-readable storage medium. When the computer program is executed by a processor, the steps in the foregoing method embodiments can be implemented. The computer program includes computer program code, and the computer program code may be in a source code form, an object code form, an executable file form, some intermediate forms, or the like. The computer-readable medium may include at least any entity or apparatus, a recording medium, a computer memory, a read-only memory (ROM), a random access memory (RAM), an electrical carrier signal, a telecommunications signal, and a software distribution medium that can carry computer program code to a terminal device, for example, a USB flash drive, a mobile hard disk, a magnetic disk, or a compact disc. In some jurisdictions, according to legislation and patent practice, a computer-readable medium cannot be an electrical carrier signal or a telecommunications signal.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A package deployment method, comprising:
   searching for a package adapted to each of a plurality of devices, wherein a registration operation of the plurality of devices is performed using an integrated development environment (IDE) tool; and
   distributing and deploying a found package to a corresponding device, wherein the corresponding device is a device in the plurality of devices, wherein the distributing and deploying the found package to the corresponding device comprises:
      determining whether one or more devices of the plurality of devices meets a package distribution and deployment condition; and
      for a first device in the plurality of devices that meets the package distribution and deployment condition, distributing and deploying, to the first device, a package adapted to the first device, wherein a device meets the package distribution and deployment condition based on the device having a normal power supply, having a normal communications connection, and being in a state in which the device can accept a package;

wherein the package adapted to each of the plurality of devices is generated by selecting, in the IDE, an engineering template that simultaneously supports the plurality of devices, writing, in the engineering template, an interface and service logic of an application that is adapted to the plurality of devices, and using a compiler of the IDE to separately generate debugging packages of the plurality of devices through compiling, registering, and connecting the plurality of devices with a device registration function of the IDE.

2. The package deployment method according to claim 1, wherein the registration operation of the plurality of devices comprises:

establishing communications connection to the plurality of devices by using the IDE tool;

after the communications connection is successfully established, receiving status information of each device of the plurality of devices; and displaying the status information of each device of the plurality of devices in a device list interface of the IDE tool to complete the registration operation.

3. The package deployment method according to claim 1, wherein the determining whether one or more devices of the plurality of devices meet the package distribution and deployment condition comprises:

obtaining a device identification code of a target device, wherein the target device is any device of the plurality of devices;

searching a specified storage path for a package corresponding to the device identification code; and in response to the package corresponding to the device identification code being found at the storage path and status information of the target device is a normal state, determining that the target device meets the package distribution and deployment condition.

4. The package deployment method according to claim 1, wherein the determining whether one or more devices of the plurality of devices meet the package distribution and deployment condition comprises:

obtaining a device identification code of a target device, wherein the target device is any device of the plurality of devices;

searching a specified storage path for a package corresponding to the device identification code; and in response to the package corresponding to the device identification code being not found at the storage path, determining that the target device does not meet the package distribution and deployment condition.

5. The package deployment method according to claim 1, wherein the determining whether one or more devices of the plurality of devices meet the package distribution and deployment condition comprises:

obtaining a device identification code of a target device, wherein the target device is any device of the plurality of devices;

searching a specified storage path for a package corresponding to the device identification code; and in response to the status information of the target device being an abnormal state, determining that the target device does not meet the package distribution and deployment condition.

6. The package deployment method according to claim 1, after the determining whether one or more devices of the plurality of devices meets the package distribution and deployment condition, the method further comprising:

for a second device in the plurality of devices that does not meet the package distribution and deployment condition, adding, to an icon of the second device in the device list interface, a mark indicating that package deployment fails, and outputting preset prompt information.

7. The package deployment method according to claim 1, wherein the distributing and deploying, to the first device, the package adapted to the first device comprises:

in response to a first operation instruction being received, distributing and deploying the package to the first devices.

8. The package deployment method according to claim 1, wherein the distributing and deploying, to the first device, the package adapted to the first device comprises:

in response to a second operation instruction being received, selecting at least one device other than the first device, and distributing and deploying the package to the at least one device other than the first device.

9. The package deployment method according to claim 1, after the distributing and deploying the found package to the corresponding device, the method further comprising:

receiving a debugging and running result of each of the devices for a package deployed on the device; and adding the debugging and running result to a device list interface of the IDE tool.

10. A package deployment apparatus, comprising:

a processor; and a non-transitory computer readable medium storing computer-executable instructions, wherein the processor is configured to execute the computer-executable instructions to enable the package deployment apparatus to perform operations comprising:

searching for a package adapted to each of a plurality of devices, wherein a registration operation of the plurality of devices is performed using an integrated development environment (IDE) tool; and distributing and deploying a found package to a corresponding device, wherein the corresponding device is a device in the plurality of devices, wherein the distributing and deploying the found package to the corresponding device comprises:

determining whether one or more devices of the plurality of devices meets a package distribution and deployment condition; and for a first device in the plurality of devices that meets the package distribution and deployment condition, distributing and deploying, to the first device, a package adapted to the first device, wherein a device meets the package distribution and deployment condition based on the device having a normal power supply, having a normal communications connection, and being in a state in which the device can accept a package;

wherein the package adapted to each of the plurality of devices is generated by selecting, in the IDE, an engineering template that simultaneously supports the plurality of devices, writing, in the engineering template, an interface and service logic of an application that is adapted to the plurality of devices, and using a compiler of the IDE to separately generate debugging packages of the plurality of devices through compiling, registering, and connecting the plurality of devices with a device registration function of the IDE.

11. The package deployment apparatus according to claim 10, wherein the registration operation of the plurality of devices comprises:
- establishing communications connection to the plurality of devices by using the IDE tool;
- after the communications connection is successfully established, receiving status information of each device of the plurality of devices; and
- displaying the status information of each device of the plurality of devices in a device list interface of the IDE tool to complete the registration operation.

12. The package deployment apparatus according to claim 10, wherein the determining whether one or more devices of the plurality of devices meets the package distribution and deployment condition comprises:
- obtaining a device identification code of a target device, wherein the target device is any device of the plurality of devices;
- searching a specified storage path for a package corresponding to the device identification code; and
- in response to the package corresponding to the device identification code being found at the storage path and status information of the target device is a normal state, determining that the target device meets the package distribution and deployment condition.

13. The package deployment apparatus according to claim 10, wherein the determining whether one or more devices of the plurality of devices meets the package distribution and deployment condition comprises:
- obtaining a device identification code of a target device, wherein the target device is any device of the plurality of devices;
- searching a specified storage path for a package corresponding to the device identification code; and
- in response to the package corresponding to the device identification code being not found at the storage path, determining that the target device does not meet the package distribution and deployment condition.

14. The package deployment apparatus according to claim 10, wherein the determining whether one or more devices of the plurality of devices meets the package distribution and deployment condition comprises:
- obtaining a device identification code of a target device, wherein the target device is any device of the plurality of devices;
- searching a specified storage path for a package corresponding to the device identification code; and
- in response to the status information of the target device being an abnormal state, determining that the target device does not meet the package distribution and deployment condition.

15. The package deployment apparatus according to claim 10, after the determining whether one or more devices of the plurality of devices meets the package distribution and deployment condition, the processor is further configured to execute the computer-executable instructions to enable the package deployment apparatus to perform operations comprising:
- for a second device in the plurality of devices that does not meet the package distribution and deployment condition, adding, to an icon of the second device in the device list interface, a mark indicating that package deployment fails, and outputting preset prompt information.

16. The package deployment apparatus according to claim 10, wherein the distributing and deploying, to the first device, the package adapted to the first device comprises:
- in response to a first operation instruction being received, distributing and deploying the package to the first devices.

17. The package deployment apparatus according to claim 10, wherein the distributing and deploying, to the first device, the package adapted to the first device comprises:
- in response to a second operation instruction being received, selecting at least one device other than the first device, and distributing and deploying the package to the at least one device other than the first device.

18. A non-transitory computer-readable medium storing computer-executable instructions, wherein the computer-executable instructions, when executed by a processor, enables a package deployment apparatus to perform operations comprising:
- searching for a package adapted to each of a plurality of devices, wherein a registration operation of the plurality of devices is performed using an integrated development environment (IDE) tool; and
- distributing and deploying a found package to a corresponding device, wherein the corresponding device is a device in the plurality of devices, wherein the distributing and deploying the found package to the corresponding device comprises:
  - determining whether one or more devices of the plurality of devices meets a package distribution and deployment condition; and
  - for a first device in the plurality of devices that meets the package distribution and deployment condition, distributing and deploying, to the first device, a package adapted to the first device, wherein a device meets the package distribution and deployment condition based on the device having a normal power supply, having a normal communications connection, and being in a state in which the device can accept a package;
- wherein the package adapted to each of the plurality of devices is generated by selecting, in the IDE, an engineering template that simultaneously supports the plurality of devices, writing, in the engineering template, an interface and service logic of an application that is adapted to the plurality of devices, and using a compiler of the IDE to separately generate debugging packages of the plurality of devices through compiling, registering, and connecting the plurality of devices with a device registration function of the IDE.

* * * * *

UNITED STATES PATENT AND TRADEMARK OFFICE
CERTIFICATE OF CORRECTION

PATENT NO. : 12,217,037 B2
APPLICATION NO. : 17/825897
DATED : February 4, 2025
INVENTOR(S) : Wei Huang Page 1 of 1

It is certified that error appears in the above-identified patent and that said Letters Patent is hereby corrected as shown below:

In the Claims

Claim 7: Column 22, Line 14: "devices." should read as -- device. --.

Claim 16: Column 24, Line 12: "devices." should read as -- device. --.

Signed and Sealed this
Twenty-ninth Day of July, 2025

Coke Morgan Stewart
*Acting Director of the United States Patent and Trademark Office*